US011530056B2

(12) United States Patent
Evans et al.

(10) Patent No.: US 11,530,056 B2
(45) Date of Patent: Dec. 20, 2022

(54) DIRECT TO CONTAINER SYSTEM WITH ON-LINE WEIGHT CONTROL AND ASSOCIATED METHOD

(71) Applicant: Altria Client Services LLC, Richmond, VA (US)

(72) Inventors: James D. Evans, Chesterfield, VA (US); Herbert Cary Longest, Midlothian, VA (US); Tamika S. Murrell, Richmond, VA (US); Robert V. Powell, Jr., Midlothian, VA (US); Jeremy Straight, Midlothian, VA (US); Jarrod W. Chalkley, Mechanicsville, VA (US)

(73) Assignee: Altria Client Services LLC, Richmond, VA (US)

( * ) Notice: Subject to any disclaimer, the term of this patent is extended or adjusted under 35 U.S.C. 154(b) by 15 days.

(21) Appl. No.: 17/199,742

(22) Filed: Mar. 12, 2021

(65) Prior Publication Data
US 2021/0197991 A1 Jul. 1, 2021

Related U.S. Application Data

(63) Continuation of application No. 16/291,136, filed on Mar. 4, 2019, now Pat. No. 10,981,682, which is a
(Continued)

(51) Int. Cl.
*B65B 5/10* (2006.01)
*B65B 29/00* (2006.01)
(Continued)

(52) U.S. Cl.
CPC ............. *B65B 5/101* (2013.01); *B65B 1/24* (2013.01); *B65B 1/46* (2013.01); *B65B 5/061* (2013.01);
(Continued)

(58) Field of Classification Search
CPC .. B65B 1/46; B65B 1/24; B65B 29/00; B65B 43/54; B65B 5/101; B65B 5/08;
(Continued)

(56) References Cited

U.S. PATENT DOCUMENTS 2,395,898 A 3/1946 Mohr
2,596,018 A 5/1952 Fishburn et al.
(Continued)

FOREIGN PATENT DOCUMENTS

DE 1024006 B 2/1958
DE 69727602 T2 * 7/2004 ............. B29C 65/02
(Continued)

OTHER PUBLICATIONS

European Search Report of European Application No. 13751073 dated Oct. 11, 2016.
(Continued)

*Primary Examiner* — Thomas M Wittenschlaeger
(74) *Attorney, Agent, or Firm* — Harness, Dickey & Pierce, P.L.C.

(57) ABSTRACT

Systems and methods for manufacturing and inserting a predetermined number of material-filled pouches into containers are disclosed. A system includes a pouch providing system comprising a plurality of lanes, wherein each one of the plurality of lanes includes a pouch making machine and a hold-back structure. The system also includes a conveyor system structured and arranged to move a plurality of containers into alignment with the plurality of lanes. The system further includes a controller structured and arranged to control the hold-back structure in each one of the plurality of lanes such that the pre-determined pouches are inserted into the plurality of containers when the plurality of containers are aligned with the plurality of lanes.

19 Claims, 12 Drawing Sheets

Related U.S. Application Data continuation of application No. 13/967,181, filed on Aug. 14, 2013, now Pat. No. 10,220,969.

(60) Provisional application No. 61/683,034, filed on Aug. 14, 2012.

(51) Int. Cl.

| | | |
|---|---|---|
| *B65B 35/30* | (2006.01) | |
| *B65B 39/00* | (2006.01) | |
| *B65B 43/54* | (2006.01) | |
| *B65B 65/00* | (2006.01) | |
| *B65B 1/46* | (2006.01) | |
| *B65B 5/06* | (2006.01) | |
| *B65B 5/08* | (2006.01) | |
| *B65B 1/24* | (2006.01) | |
| *B65B 37/10* | (2006.01) | |
| *B65B 9/20* | (2012.01) | |

(52) U.S. Cl.
CPC .............. *B65B 5/08* (2013.01); *B65B 29/00* (2013.01); *B65B 35/30* (2013.01); *B65B 39/007* (2013.01); *B65B 43/54* (2013.01); *B65B 65/006* (2013.01); *B65B 9/20* (2013.01); *B65B 37/10* (2013.01); *B65B 2220/18* (2013.01)

(58) Field of Classification Search
CPC ....... B65B 5/061; B65B 37/10; B65B 39/007; B65B 35/30; B65B 35/32; B65B 65/006; B65B 2220/18; B65B 9/20
See application file for complete search history.

(56) References Cited

U.S. PATENT DOCUMENTS

| | | |
|---|---|---|
| 2,669,813 A | 2/1954 | Irmscher |
| 2,712,408 A | 7/1955 | Weber |
| 2,851,063 A | 9/1958 | Leinhart |
| 2,901,209 A | 8/1959 | Bardy et al. |
| 2,981,298 A | 4/1961 | Vogt |
| 3,155,125 A | 11/1964 | Hansel |
| 3,179,041 A | 4/1965 | Luthi |
| 3,200,859 A | 8/1965 | Parker |
| 3,206,062 A | 9/1965 | Rappaport |
| 3,332,456 A | 7/1967 | Hasch |
| 3,357,155 A | 12/1967 | Carruthers |
| 3,369,577 A | 2/1968 | Johnson |
| 3,424,209 A | 1/1969 | Di Settembrini |
| 3,476,037 A | 11/1969 | Gorby |
| 3,484,813 A | 12/1969 | Davies |
| 3,490,391 A | 1/1970 | Vogt |
| 3,616,493 A | 11/1971 | Okubo |
| 3,654,855 A | 4/1972 | Longo |
| 3,854,391 A | 12/1974 | Ackroyd |
| 3,882,771 A | 5/1975 | Frohbieter |
| 3,925,960 A * | 12/1975 | Saari ..................... B65B 37/005 53/167 |
| 3,994,321 A | 11/1976 | Eisenberg |
| 4,053,003 A | 10/1977 | Ferrero et al. |
| 4,098,055 A | 7/1978 | Calvert |
| 4,363,204 A | 12/1982 | Ohude et al. |
| 4,494,582 A | 1/1985 | Meyer |
| 4,703,765 A | 11/1987 | Paules et al. |
| 4,804,550 A | 2/1989 | Bardsley et al. |
| 4,817,521 A | 4/1989 | Katada et al. |
| 4,884,601 A | 12/1989 | Hatakeyama et al. |
| 4,887,411 A | 12/1989 | Rondeau et al. |
| 4,967,538 A | 11/1990 | Leftault, Jr. et al. |
| 5,090,180 A | 2/1992 | Sorensen |
| 5,144,889 A | 9/1992 | Alig et al. |
| 5,401,156 A | 3/1995 | Anderson |
| 5,406,990 A | 4/1995 | Haeberli |
| 5,762,116 A | 6/1998 | Moore |
| 5,806,287 A | 9/1998 | Trechsel |
| 5,819,507 A | 10/1998 | Kaneko et al. |
| 5,822,949 A | 10/1998 | Naoi |
| 5,897,090 A | 4/1999 | Smith et al. |
| 6,119,440 A | 9/2000 | Benner, Jr. et al. |
| 6,390,330 B2 | 5/2002 | Runft |
| 6,516,939 B1 | 2/2003 | Schmidt et al. |
| 6,715,518 B2 | 4/2004 | Finkowski et al. |
| 7,032,743 B2 | 4/2006 | Vorsteher et al. |
| 7,331,156 B2 | 2/2008 | Hartness et al. |
| 8,485,232 B1 | 7/2013 | Oropeza |
| 8,757,167 B1 | 6/2014 | Jurczenia et al. |
| 8,991,442 B1 | 3/2015 | Navin et al. |
| 9,150,320 B2 | 10/2015 | Wurster et al. |
| 9,694,921 B2 | 7/2017 | Oropeza |
| 9,845,170 B2 | 12/2017 | Evans et al. |
| 10,641,669 B2 | 5/2020 | Schlipf et al. |
| 10,654,597 B2 | 5/2020 | Evans et al. |
| 2002/0046551 A1 | 4/2002 | Tisma |
| 2004/0020554 A1 | 2/2004 | Smith et al. |
| 2005/0217208 A1 | 10/2005 | Cicognani |
| 2007/0011994 A1* | 1/2007 | Wooldridge ............ B65B 57/20 53/506 |
| 2007/0062159 A1 | 3/2007 | Medina et al. |
| 2009/0113847 A1 | 5/2009 | Monti et al. |
| 2009/0120828 A1 | 5/2009 | Sanfilippo et al. |
| 2009/0165425 A1 | 7/2009 | Medina et al. |
| 2009/0288375 A1 | 11/2009 | Pagani |
| 2010/0059069 A1* | 3/2010 | Boldrini .................. B65B 9/213 131/112 |
| 2010/0101189 A1 | 4/2010 | Boldrini |
| 2010/0115886 A1 | 5/2010 | Takayama et al. |
| 2010/0133066 A1 | 6/2010 | Bassini |
| 2011/0173933 A1 | 7/2011 | Maheshwari et al. |
| 2019/0193876 A1 | 6/2019 | Evans et al. |

FOREIGN PATENT DOCUMENTS

| | | |
|---|---|---|
| EP | 1415919 A1 | 5/2004 |
| EP | 2129581 A2 | 12/2009 |
| FR | 2666047 A1 | 2/1992 |
| WO | WO-02051704 A1 | 7/2002 |

OTHER PUBLICATIONS

International Preliminary Report on Patentability for Application No. PCT/US2013/054979 dated Feb. 26, 2015.
International Search Report for Application No. PCT/US2013/054979 dated Dec. 6, 2013.
European Office Action for European Application No. 13751073.1 dated Sep. 26, 2017.
United States Office Action for U.S. Appl. No. 15/730,528, dated Sep. 11, 2019.
Notice of Allowance for U.S. Appl. No. 15/730,528, dated Jan. 29, 2020.
U.S. Office Action dated Nov. 9, 2020 for corresponding U.S. Appl. No. 16/863,269.
U.S. Notice of Allowance dated Nov. 12, 2020 for corresponding U.S. Appl. No. 16/291,136.
U.S. Notice of Allowance dated Dec. 16, 2020 for corresponding U.S. Appl. No. 16/291,136.
U.S. Notice of Allowance dated Feb. 10, 2021 for corresponding U.S. Appl. No. 16/863,269.

\* cited by examiner

DIRECT TO CONTAINER SYSTEM WITH ON-LINE WEIGHT CONTROL AND ASSOCIATED METHOD

CROSS-REFERENCE TO RELATED APPLICATIONS

This application is a continuation of U.S. application Ser. No. 16/291,136, filed Mar. 4, 2019, which is a continuation of U.S. application Ser. No. 13/967,181, filed Aug. 14, 2013, which claims the benefit of priority under 35 U.S.C. § 119 to U.S. Application No. 61/683,034, filed Aug. 14, 2012, the entire contents of each of which are incorporated herein by reference.

FIELD

This disclosure relates generally to systems and methods for filling containers with units of smokeless tobacco and, more particularly, to manufacturing and inserting pouches of smokeless tobacco into containers in a continuous operation with on-line weight control.

SUMMARY

Various forms of smokeless tobacco, including pouched smokeless tobacco (snus) are provided to the consumer in a lidded cylindrical container (e.g., a can) composed of metal, paperboard or plastic. Pouched snus may comprise an amount of tobacco encased in a paper case.

Heretofore, a large number of pouches were manufactured by plural pouch-making lanes and/or machines (e.g., pouchers) whose outputs were deposited together (e.g., co-mingled) in an intermediate holding bin. Such comingling can confound quality control. For example, with comingling, it may become impossible to determine which one of many pouchers caused a particular can to be over or under weight.

In accordance with aspects disclosed herein, there is a system and method for filling cans with pouches directly from a pouch-making machine, weighing the filled cans, and selectively adjusting the pouch-making machine based on the weighing. In embodiments, the system comprises a pouch-making machine having plural vertically-oriented lanes, each of which individually manufactures pouches filled with smokeless tobacco and inserts the pouches into a container (e.g., can) that may be sold to a consumer. Each lane may comprise an individual poucher and a transfer structure that guides completed pouches into a can positioned in the lane. The system may comprise a conveyor that controllably moves cans into alignment with the transfer structures of the plural lanes where each can is individually filled with pouches directly from a respective one of the lanes. In embodiments, the conveyor moves the filled cans to a tamping station and simultaneously moves a new set of empty cans into alignment with the transfer structures of the plural lanes. The system may incorporate a controllable hold-back structure in each of the transfer structures so that pouches may be continuously made even during movement of the cans by the conveyor. The system may also incorporate one or more sensors in each lane to accurately count the number of pouches inserted into each can.

In accordance with additional aspects disclosed herein, each can is weighed individually after being filled with pouches. In embodiments, the system is structured and arranged to associate each can with a respective one of the lanes, and to maintain this association through the can-weighing process. When a particular can is determined to be over or under weight via the can-weighing process, the association between the can and a particular lane may be used to adjust at least one manufacturing parameter of the lane. For example, the rate of tobacco being supplied to the poucher of a particular lane may be selectively increased or decreased based on the weighing of a can that was filled at that particular lane.

According to a first aspect, there is a system for manufacturing and inserting tobacco-filled pouches into containers. The system includes a pouch providing system comprising a plurality of lanes, wherein each one of the plurality of lanes comprises a pouch making machine and a hold-back structure. The system also includes a conveyor system structured and arranged to move a plurality of containers into alignment with the plurality of lanes. The system further includes a controller structured and arranged to control the hold-back structure in each one of the plurality of lanes such that pouches are inserted into the plurality of containers when the plurality of containers are aligned with the plurality of lanes.

According to another aspect, there is a method for manufacturing and inserting tobacco-filled pouches into containers. The method includes: engaging a plurality of containers with a conveyor system; simultaneously moving the plurality of containers into alignment with a corresponding plurality of pouch making machines; inserting pouches directly from respective ones of the plurality of pouch making machines into respective ones of the plurality of containers; individually weighing each one of the plurality of containers after the inserting; and adjusting a rate of tobacco supplied to a respective one of the plurality of pouch making machines based on the weighing.

BRIEF DESCRIPTION OF THE DRAWINGS

Various aspects are further described in the detailed description which follows, in reference to the noted plurality of drawings by way of non-limiting examples of embodiments, in which like reference numerals represent similar parts throughout the several views of the drawings.

DETAILED DESCRIPTION

Figure 1A:
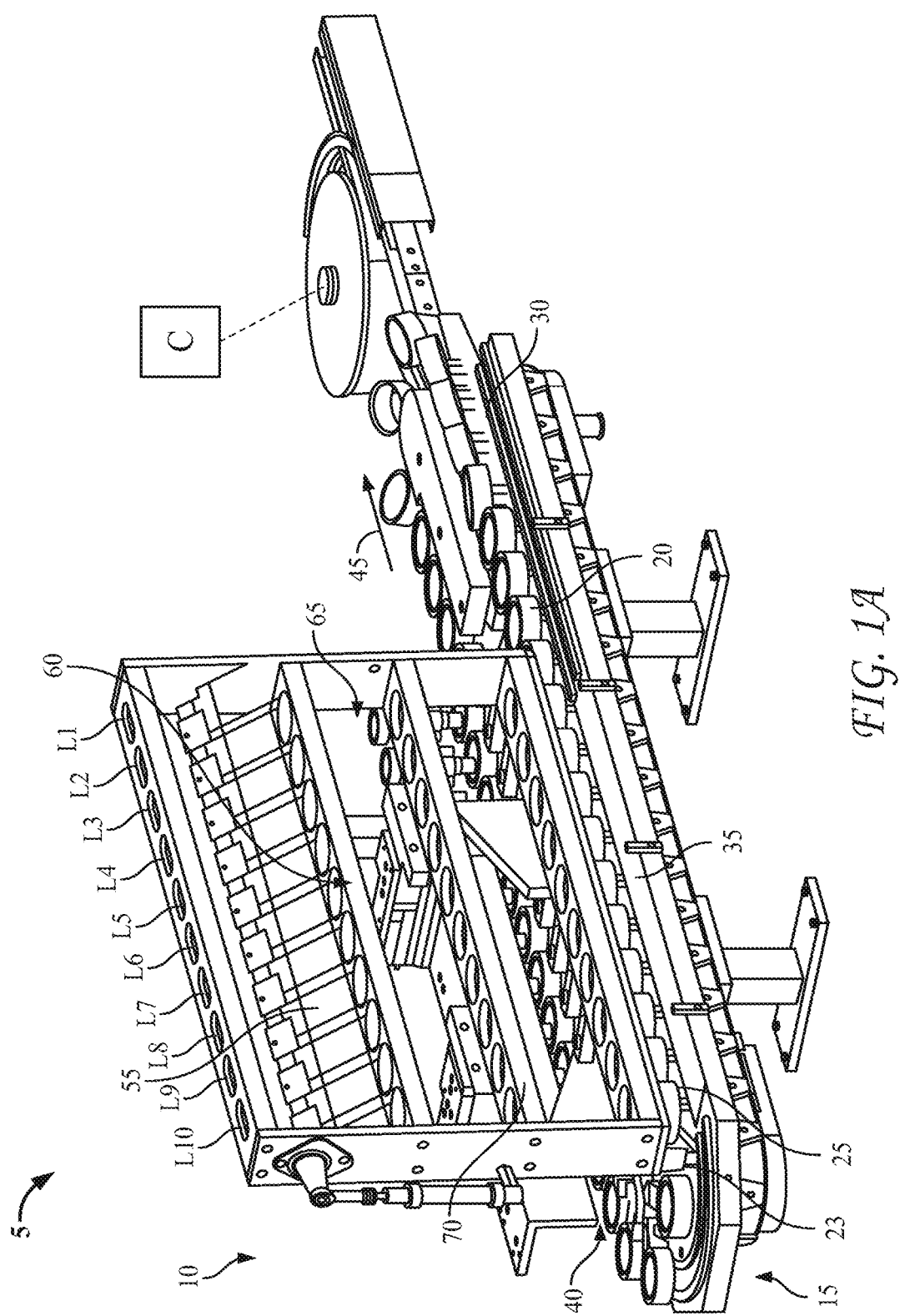
FIG. 1A shows an exemplary system for manufacturing and inserting smokeless tobacco pouches into containers in accordance herewith.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-11, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

This disclosure relates generally to systems and methods for filling containers with units of smokeless tobacco and, more particularly, to manufacturing and inserting pouches of smokeless tobacco into containers in a continuous operation with on-line weight control. According to aspects disclosed herein, a system includes plural pouch making machines that operate continuously and in parallel.

A conveyor system may be structured and arranged to simultaneously move plural empty containers into alignment with the plural pouch making machines, such that the respective containers are simultaneously filled with pouches directly from respective ones of the pouch making machines. The position of each container may be tracked throughout the entire system, and each container may be associated with the particular one of the pouch making machines from which it was filled. Each container may be weighed after being filled, and at least one operational parameter of the pouch making machine associated with the weighed container may be adjusted based on the weight of the container independent of the other pouch making machines.

FIG. 1A shows an exemplary system 5 for manufacturing and inserting pouches into containers in accordance herewith. In embodiments, the system 5 includes a direct-to-container pouch providing system 10 and a conveyor system 15. The pouch providing system 10 controls the movement of individual pouches into a plurality of containers from a plurality of pouch making lanes or machines. The conveyor system 15 moves the containers to positions in alignment with the lanes of the pouch providing system 10 such that the manufactured pouches are inserted from the pouch providing system 10 directly into the container without comingling of the pouches. As described herein, the pouches are filled with an amount of smokeless tobacco and the containers are preferably cylindrical, disc cans, which, when fully loaded, contain a predetermined number of the pouches and are intended to be sold to consumers, although implementations are not limited to use with tobacco and aspects described herein can be used with any article in which a predetermined number of the articles are to be packaged in a single container.

Figure 2:
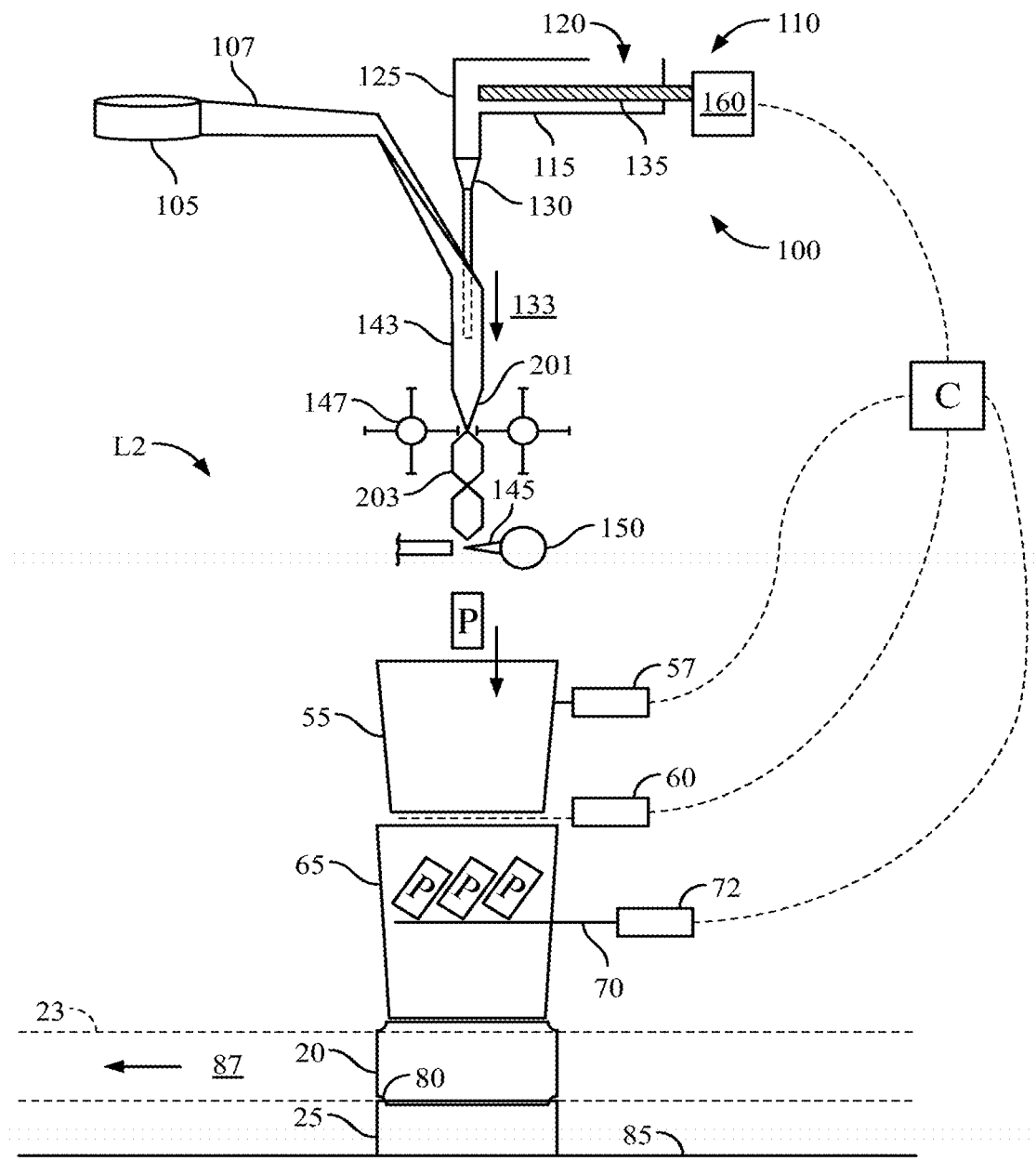
FIG. 2 shows an exemplary lane of the system of FIG. 1A.

According to aspects described herein, the pouch providing system 10 includes plural lanes L1, L2, . . . , LN, each of which constitutes a separate avenue for pouches to be manufactured and inserted directly into containers. In the non-limiting illustrative embodiment shown in FIG. 1A, the pouch providing system 10 includes ten lanes (L1-L10), although any suitable number of lanes may be used in implementations (such as by way of example, five lanes). Moreover, some of the lanes L1-L10 may be active while other ones of the lanes are inactive. In the non-limiting illustrative embodiment described herein, five of the lanes are active (e.g., lanes L2, L4, L6, L8, and L10) and five of the lanes are inactive (e.g., lanes L1, L3, L5, L7, and L9), although any suitable number of active and inactive lanes (including zero inactive lanes) may be used in implementations. Referring now to FIGS. 1A and 2, each active lane may include a sampling structure 55, one or more count sensors 60, a transfer structure 65, and a hold-back structure (or comb) 70.

Still referring to FIG. 1A, the conveyor system 15 selectively moves containers into alignment with the lanes L1-L10 for receiving the pouches. In embodiments, the conveyor system 15 includes a plurality of funnel cups 20 attached to a moveable carousel 23. Movement and stopping of the carousel 23 may be achieved by one or more suitable motors and/or actuators, which may be controlled by a controller "C". The carousel 23, when moving, preferably moves all of the funnel cups 20 simultaneously. In implementations, the conveyor system 15 is structured and arranged such that each funnel cup 20 engages an empty container 25 at an input station 30. The funnel cup 20 is structured and arranged such that the funnel cup 20 and container 25 move together when engaged. In this manner, the carousel moves the empty container 25 via the funnel cup 20 from the input station 30 to a filling zone 35 where the container is filled with a predetermined number of pouches. Similarly, the carousel moves the filled container 25 via the funnel cup 20 from the filling zone 35 to a tamping zone 40, and then moves the filled and tamped container 25 from the tamping zone 40 to an outlet 45 where the funnel cup 20 disengages the container 25.

In the embodiment depicted in FIG. 1A, each funnel cup 20 is pivotally connected to the carousel. Specifically, each funnel cup 20 is pivoted slightly upward (e.g., relative to a substantially horizontal position the funnel cup 20 exhibits at the filling zone 35 and tamping zone 40) as the funnel cup 20 is moved toward the outlet 45 to disengage the funnel cup 20 from the container 25. The funnel cup 20 remains in the upward pivoted position as it moves between the outlet 45 and the input station 30. The funnel cup 20 pivots downward to the substantially horizontal position at the input station 30. The downward pivoting causes the funnel cup 20 to engage an empty container 25 at the input station. The upward and downward pivoting of each funnel cup 20 may be accomplished in any suitable manner, including but not limited to the use of cams, inclined surfaces, actuators, etc. In a preferred embodiment, a procession of open ended cans is directed unto the input station 30 via an inclined ramp or other feed mechanism.

Figure 1B:
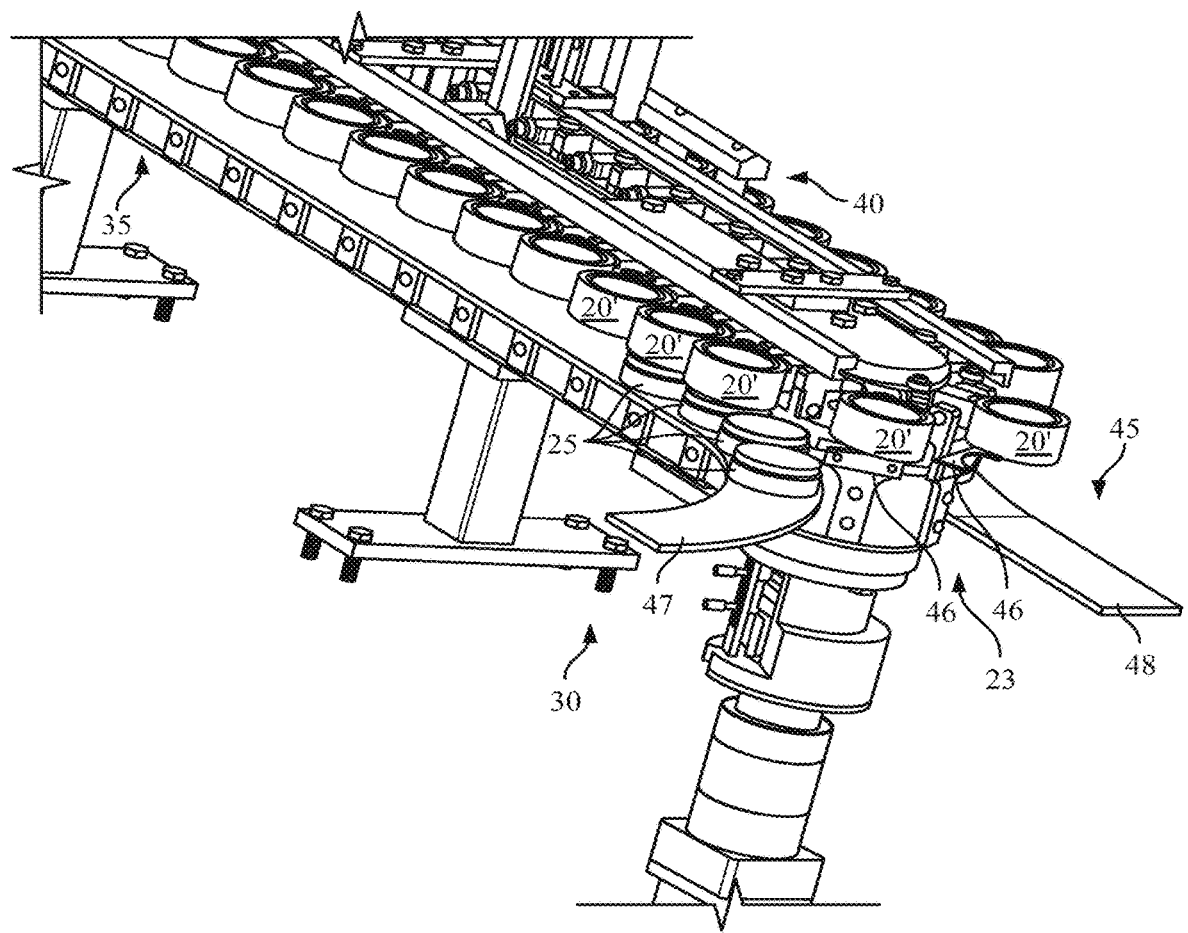
FIGS. 1B and 1C show an alternative embodiment of aspects of the system.
Figure 9:
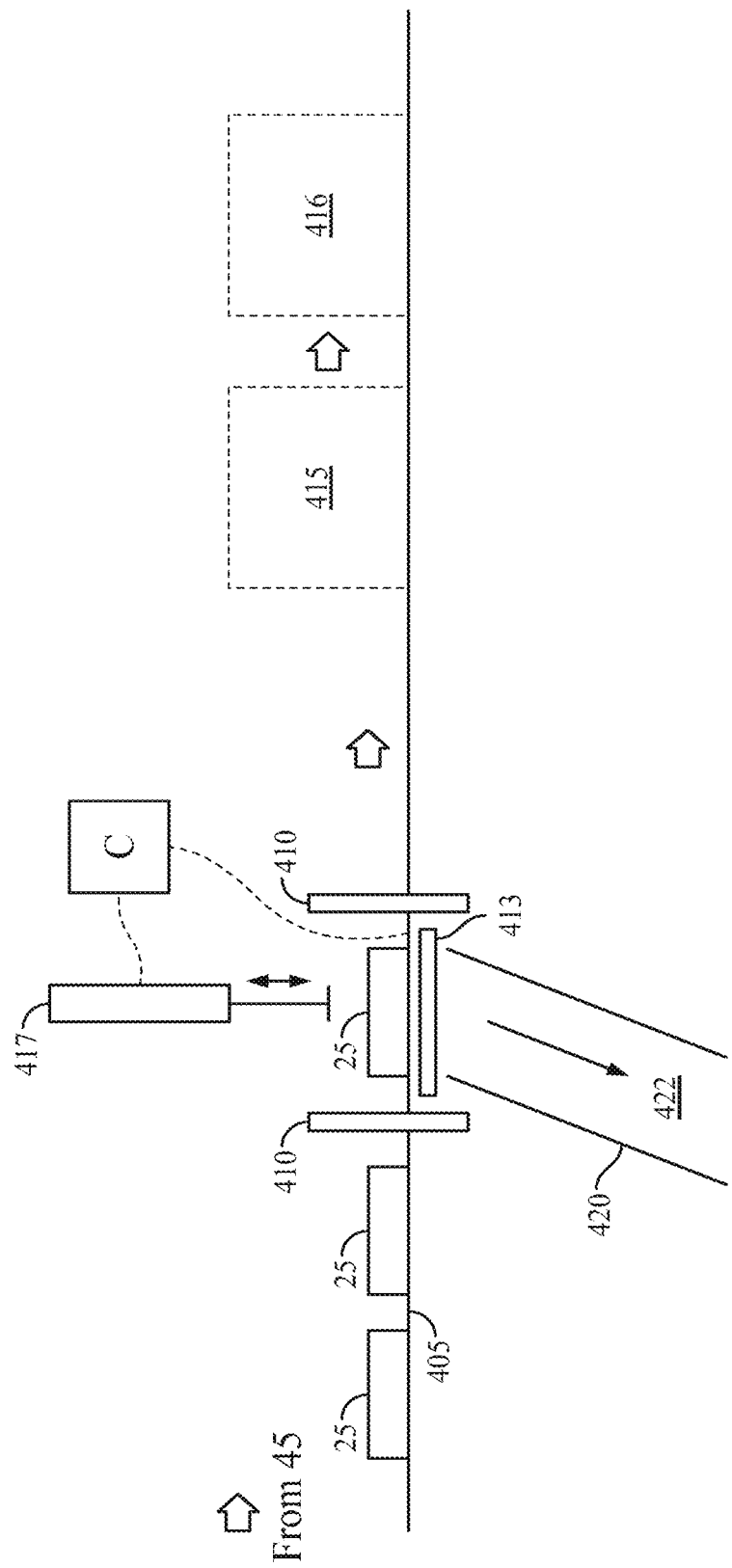
FIG. 9 shows an exemplary on-line weighing system in accordance herewith.
Figure 10:
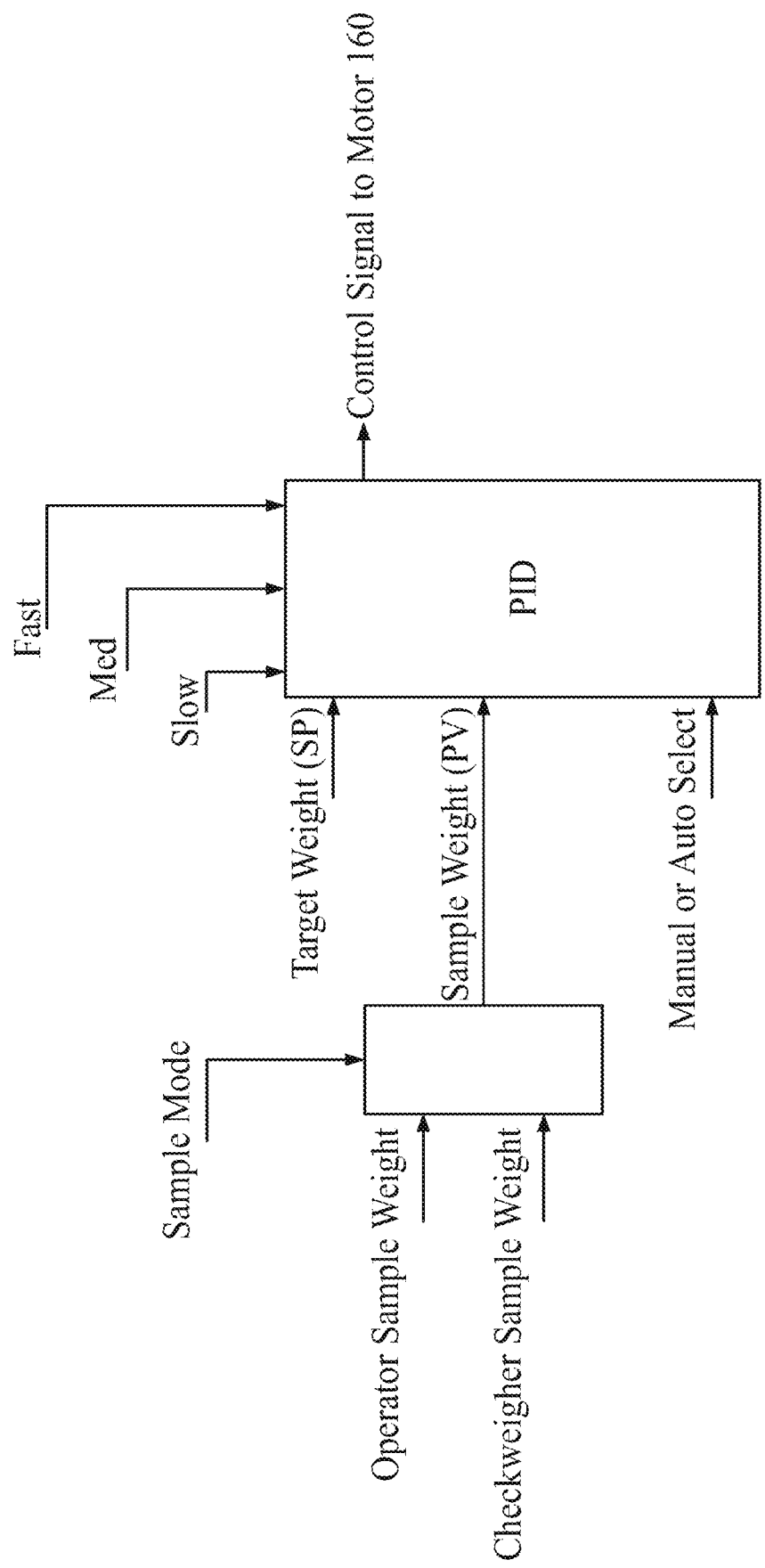
FIG. 10 depicts a block diagram of a control scheme in accordance herewith.

In another embodiment shown in FIGS. 1B and 10, each funnel cup 20' has an integrated carrier fork 46 structured and arranged to engage one of the containers 25 and to carry (e.g., movably guide) the container 25 through the filling zone 35 (e.g., for the receipt of pouches) and tamping zone 40. These funnel cups 20' are solidly mounted to the carousel 23 and do not pivot to engage the container. Instead, at the input station 30, each container 25 is cammed up (or otherwise elevated) to the bottom of a respective funnel cup 20' via a slight inclined ramp 47 that guides the bottom of the container 25 to a point where the carrier fork 46 moves into engagement with the exterior of the container 25. Once engaged by the carrier fork 46, the container 25 is guided through the filling zone 35 and tamping zone 40 by the carrier fork 46 instead of by contact with the bottom of the funnel cup 20'. As shown in FIG. 10, upon reaching the outlet 45, the container 25 is lowered away from the funnel cup 20' via a slight declined ramp 48. The carrier fork 46 of the funnel cup 20' continues to push the container 25 until the container is engaged on a take-away conveyor that leads to a downstream station, such as the on-line weigh station described in greater detail below with respect to FIG. 9.

Figure 1C:
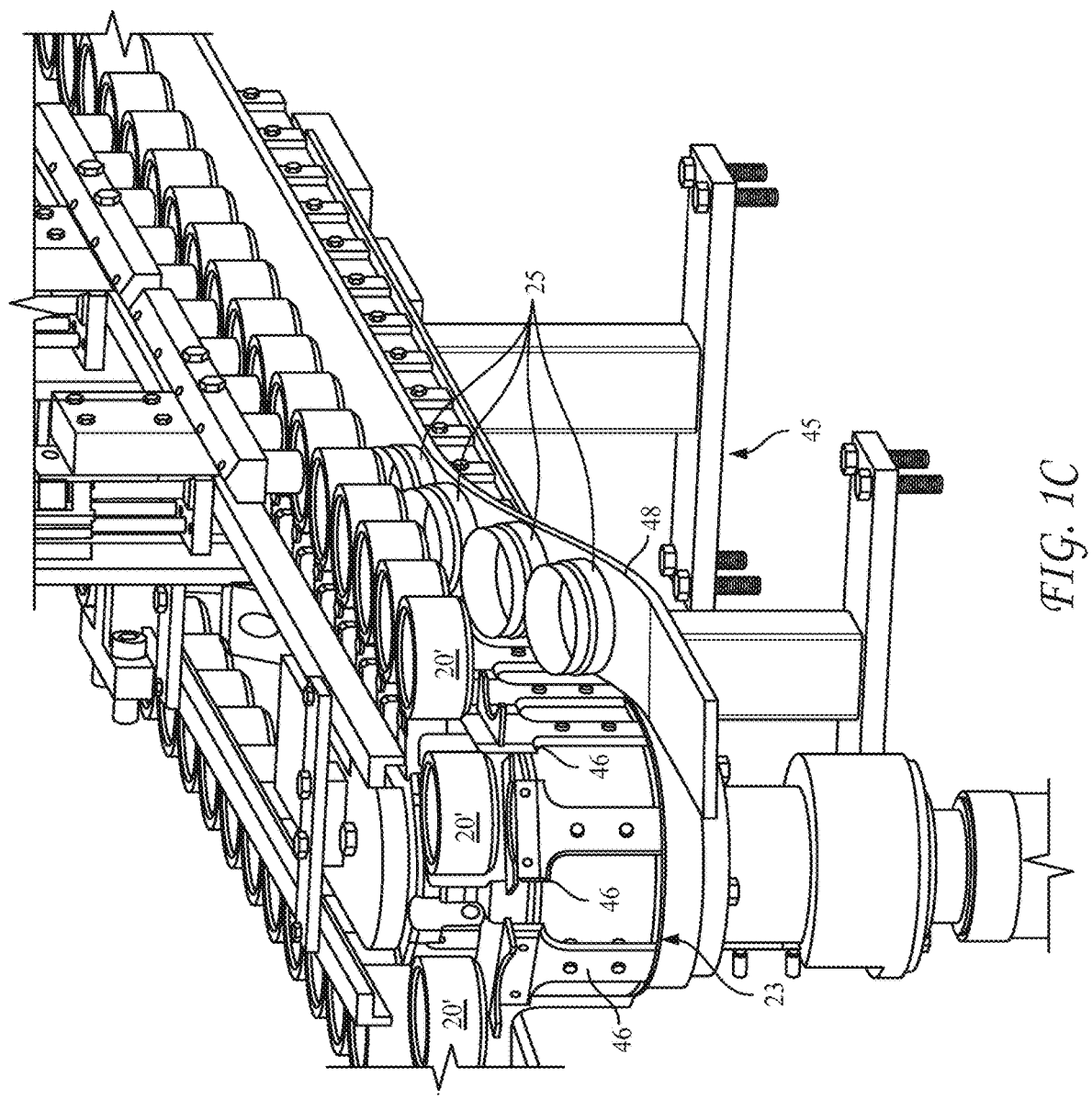

The embodiment of FIGS. 1B and 1C minimizes funnel movement and wear, and allows for minimal contact between the funnel cups 20' and the containers 25. This is advantageous for use with containers having internal coatings (such as paraffin wax) since, with minimal funnel cup contact, such coatings (e.g., wax) do not build up on funnel that may impede the feeding capabilities of the pouches into the containers 25. Moreover, the funnel cups 20' being solidly mounted to the carousel 23 (e.g., without pivoting) results in a robust attachment point.

FIG. 2 shows exemplary components included in a single active lane and, thus, illustrates a lane (e.g., lane L2) of the system 5 of FIG. 1A. Referring to FIGS. 1 and 2, lane L2 includes a sampling structure 55, one or more count sensors 60, a transfer structure 65, and a hold-back structure (comb) 70. A pouch making machine (e.g., a poucher) 100 manufactures and delivers individual pouches "P" to the sampling structure 55.

In embodiments, the sampling structure 55 comprises a tube, funnel, or other structure that receives pouches P from the poucher 100 and guides the pouches P to one of two locations. The sampling structure 55 may be pivoted between first and second positions. In the first position, an outlet of the sampling structure 55 is substantially aligned with an inlet of the transfer structure 65 such that pouches P move (e.g., by gravity) from the sampling structure 55 to the transfer structure 65. In the second position, the outlet of the sampling structure 55 is pivoted away from the inlet of the transfer structure 65 such that pouches are diverted to a reject/sample bin (not shown). The pivoting of the sampling structure 55 between the first and second positions may be manually controlled or may be automated (e.g., with an actuator). For example, the sampling structure 55 may be pivoted between the first and second positions by an actuator 57 that is controlled by the controller C, which may comprise a programmable computer device.

The transfer structure 65 may comprise a tube, funnel, or other structure that receives pouches P from the sampling structure 55 and guides the pouches P to the container 25 via the funnel cup 20. The hold-back structure 70 may be provided at the transfer structure 65 and operates to selectively permit or prevent the passage of pouches P through the transfer structure 65. For example, the hold-back structure 70 may be selectively moveable between first and second positions. In the first position, the hold-back structure 70 substantially blocks the transfer structure 65 such that pouches P can enter but cannot exit the transfer structure 65. In the second position, the hold-back structure 70 is retracted and does not block the flow of pouches through the transfer structure 65 and, instead, permits any pouch P in the transfer structure 65 to fall into the container 25.

The transfer structure 65 and hold-back structure 70 provide a mechanism for ensuring that pouches P are only directed to the container 25 when the container 25 is substantially aligned (e.g., vertically aligned) with the transfer structure 65. As described in greater detail herein, the poucher 100 continuously produces pouches P, e.g., at a rate of about one pouch per second. Accordingly, the hold-back structure 70 may be closed (e.g., moved to the first position) when the carousel is moving containers between the lanes (e.g., L1-L10) of the system. The pouches P accumulate inside the transfer structure 65 when the hold-back structure 70 is in the first (e.g., closed) position, i.e., to avoid being dropped onto the conveyor system 15 when a container 25 is not in proper position for receiving the pouches. Subsequently, when the carousel 23 has moved the container 25 into substantial alignment with the transfer structure 65 and come to a stop, the hold-back structure 70 is moved from the first (closed) position to the second (open) position and any pouches P that have accumulated in the transfer structure 65 drop into the container 25. Depending on the amount of time that the hold-back structure 70 is held in the second (open) position, other pouches P may pass through the transfer structure 65 and fall into the container 25 without accumulating in the transfer structure 65. In this manner, the poucher 100 may be structured and arranged to continuously produce pouches P even while the conveyor system 15 is moving containers 25 within the system.

As such, hold-back structure 70 can be structured and arranged so as to block the transfer of pouches P during the period when a filled container 25 is being replaced by an empty container 25. As may be appreciated, when configured in this manner, hold-back structure 70 does not serve to hold-back the entire predetermined number of pouches P that are intended for filling container 25, but rather only those produced during the period when a filled container 25 is being replaced by an empty container 25. As those skilled in the art will plainly recognize, however, hold-back structure 70 can be structured and arranged so as to block the transfer of the entire predetermined number of pouches P that are intended for filling container 25, or any number in between. As such, in embodiments, the hold-back structure may remain at its first, closed position until a predetermined number of pouches have accumulated.

In embodiments, the hold-back structure 70 comprises a gate having a number of finger-like members that are moved into and out of the transfer structure 65. For example, the transfer structure 65 may comprise a cylindrical tube with a sidewall, and may have holes in the sidewall. The hold-back structure 70 may comprise a number of finger-like members aligned with and moveable through the holes, e.g., in a direction substantially perpendicular to the flow of pouches P through the transfer structure 65. An actuator 72 that is controlled by the controller C may be used to selectively move the finger-like members of the hold-back structure 70 between the first (closed) position in which the finger like members are inside the transfer structure 65, and the second (open) position in which the finger like members are not inside the transfer structure 65. It is noted that the hold-back structure 70 is not limited to the finger-like members described herein, and any mechanism that controllably blocks and unblocks the transfer structure 65 may be used in implementations.

Still referring to FIG. 2, at least one count sensor 60 may be provided in the lane L2 to detect a number of pouches P that have been inserted into the container 25 or, alternatively or in addition, may count the number of pouches P that have been delivered to the transfer structure 65 since the last release of pouches P by the hold-back structure 70. The count sensor 60 may comprise, for example, a photo-eye structured and arranged to detect the passage of a pouch P between the sampling structure 55 and the transfer structure 65. The count sensor 60 may communicate with the controller C such that the controller C may be configured to detect a number of pouches that have been inserted into the particular container.

As further illustrated in FIG. 2, the funnel cup 20 may comprise a hollow cylinder, the hollow interior of which guides pouches P from an outlet of the transfer structure 65 to the container 25. In embodiments, the funnel cup 20 includes a lower portion, e.g., a shoulder 80, which fits inside the container 25 and engages an interior wall of the container 25 for moving the container 25 through the system via the carousel 23. For example, the funnel cup 20 and carousel 23 may cause the container to move (e.g., slide) along a surface 85 of the conveyor system 15, e.g., as indicated by arrow 87.

FIG. 2 also shows an exemplary poucher 100 associated with lane L2. In embodiments, the poucher 100 comprises a paper (or web) source 105 and a tobacco source 110. The paper source 105 may comprise a spool (or bobbin) of paper 107 used in making the pouches P. The tobacco source 110 may comprise a bin 115 having an inlet 120 for receiving tobacco to the bin 115, and an outlet 125 for removing tobacco from the bin 115. A funnel 130 or other conduit may be provided at the outlet 125. The poucher 100 may be structured and arranged to wrap the paper 107 around a forming section, adjacent a downstream end portion of the funnel 130 to form a tubular paper body 143 while the paper is drawn in a substantially vertical downward direction, e.g., as indicated by arrow 133. The paper is drawn by the drawing action of the rotary cross-sealing bars 147. A rotary tobacco feeder (extruder) 135 moves tobacco inside the bin 115 toward the outlet 125 and into the funnel 130. In an embodiment, the tobacco feeder 135 is a twin screw feeder whose output is adjusted by controlling the amount of rotation of the screws for each feed cycle. The feed cycle is timed by controller C to deliver a predetermined charge of tobacco at or about the time that the rotary cross-sealing bars 147 create a transverse seal across the tubular paper body 143. The seal establishes a partially formed, open-ended new pouch 201 (above the sealing bars) and completely closes the pouched structure 203 just below the sealing bars 147. The partially formed open-ended new pouch 201 receives the timed charge of tobacco from the feeder 135 before being closed and sealed upon further rotation of the rotary sealing bars 147. Individual pouches P are cut from the end of the cylindrical rod 140 at a predetermined rate, e.g., about one pouch P per second. After being cut, a pouch P falls (e.g., by gravity) into the sampling structure 55. It is noted, however, that implementations are not limited to the pouchers 100 described herein, and any suitable poucher may be used to provide pouches P to the sampling structure 55. A particularly suitable poucher may be obtained from Ropak Manufacturing Company, Inc. of Decatur, Ala., USA.

According to aspects described herein, the amount of tobacco discharged from the feeder 135 into the funnel 130 affects the amount of tobacco that is provided in each pouch P, which, in turn, affects the total amount of tobacco that is included in a single container 25. For example, the feeder 135 may comprise a screw-type feeder used for discharging tobacco from the inlet 120 to the outlet 125 and into the funnel 130. The screw of the feeder 135 may be rotated by a motor 160 that is controlled by the controller C. The output of the motor 160 may be increased increase the amount of rotation of the screw of the feeder 135, which increases the flow rate (e.g., mass flow rate) per feed cycle of tobacco into the funnel 130. Alternatively, the output of the motor 160 may be decreased to reduce the amount of rotation of the screw of the feeder 135, to decrease the flow rate of tobacco per cycle into the funnel 130. In lieu or in addition, the speed of the motor 160 may be adjusted to adjust feed rate per cycle.

The amount of tobacco into the funnel 130 affects the weight of each pouch P made in the poucher 100, such that the feeder 135 may be controlled to affect the weight of the container 25 when a given number of pouches P are inserted into each container. In this manner, and as described in greater detail herein, a container 25 that is filled with a number of pouches at lane L2 may be weighed at a location downstream of the outlet 45, and the speed (and/or duration) of the feeder 135 at lane L2 may be altered (e.g., increased or decreased) based on the weighing, e.g., to ensure that a desired amount of tobacco is being provided in subsequent containers filled at this lane.

FIG. 2 has been used to describe a single active lane L2. It should be understood, however, that each active lane in the pouch providing system 10 of FIG. 1A may be implemented in a manner similar to that described with respect to FIG. 2. In embodiments, each active lane is provided with a respective a sampling structure 55, count sensor 60, transfer structure 65, hold-back structure 70, and poucher 100, such that pouches made by the poucher 100 are inserted directly into a container 25. As used herein, the phrase 'inserted directly' may be construed to mean that a container 25 receives pouches P directly from a single poucher or lane 100, and not from a plurality of different pouchers, e.g., the output of pouches from plural pouchers or lanes are not co-mingled. The hold-back structure 70 and feeder 135 in each lane, as well as the conveyor system 15, may all be controlled by the controller C for coordinating the movement of the containers with the manufacturing and dropping of the pouches in each lane. In this manner, plural active lanes may be operating simultaneously and in parallel to one another, continuously producing pouches and inserting the pouches directly into containers. Moreover, by providing a respective poucher in each active lane, the flow rate of tobacco in each active lane may be individually adjusted and controlled exclusively and independently of the other active lanes.

FIGS. 3-8 show block diagrams depicting an exemplary operation of the system 5 in accordance with aspects described herein. Positions P1, P2, . . . , P30 represent discrete positions where containers (e.g., containers 25) may be positioned by the conveyor system (e.g., conveyor system 15). Positions P1-P10 correspond to lanes L1-L10 in the filling zone 35. As described with respect to FIG. 1A, lanes L2, L4, L6, L8, and L10 are active lanes (e.g., similar to that shown in FIG. 2), and lanes L1, L3, L5, L7, and L9 are inactive lanes (e.g., do not provide pouches to containers). Positions P11-P20 are empty positions downstream of the filling zone 35. Positions P21-P30 correspond to tamping positions in the tamping zone 40. Although the positions P1-P30 are depicted in a linear fashion, it is understood that the conveyor system may have any desired shape, such as an uninterrupted, generally elliptical shape as shown in FIG. 1A.

Figure 3:
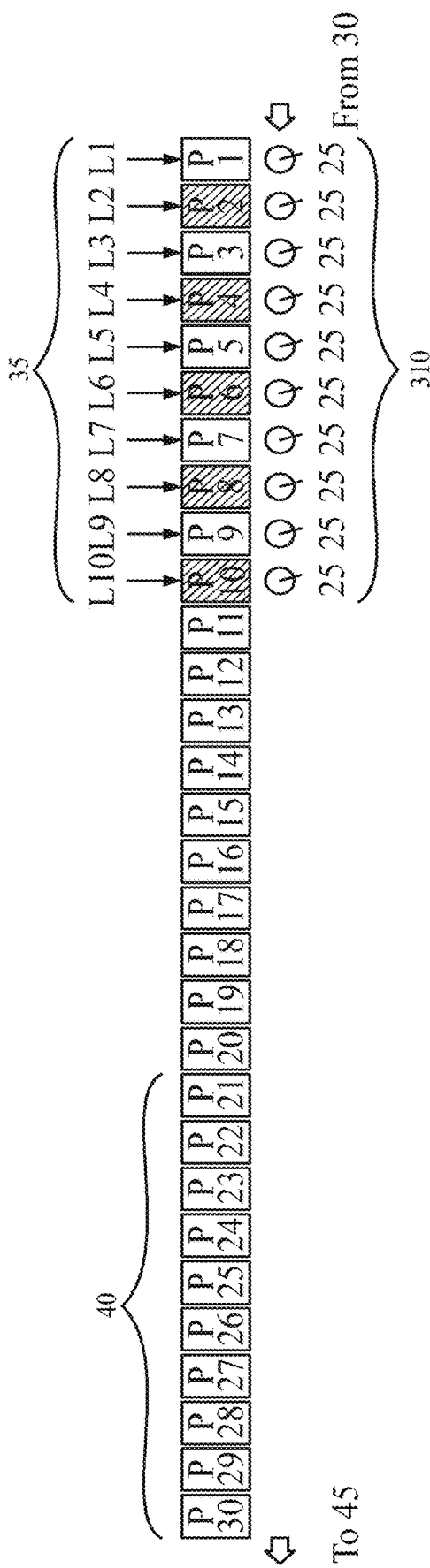
FIGS. 3-8 illustrate an exemplary operation of the system of FIG. 1A.

As shown in FIG. 3, a first group 310 of ten containers 25 is moved into positions P1-P10, e.g., by the conveyor system moving funnel cups through the input zone 30 to engage empty containers and into the filling zone 35. The respective hold-back structures (e.g., hold-back structures 70) at lanes L2, L4, L6, L8, and L10 are moved to the closed position while the conveyor system advances the containers 25 into the filling zone 35 so that pouches P are retained during movement of the cans. The respective pouchers (e.g., pouchers 100) at lanes L2, L4, L6, L8, and L10 continue to produce pouches while the conveyor system advances the containers 25 into the filling zone 35. When the conveyor system has moved the group 310 to positions P1-P10, the conveyor system stops and the hold-back structures open to release any retained pouches P into a first subset of the containers of the group 310 and to allow additional pouches to be delivered according to a predetermined count.

Figure 4:
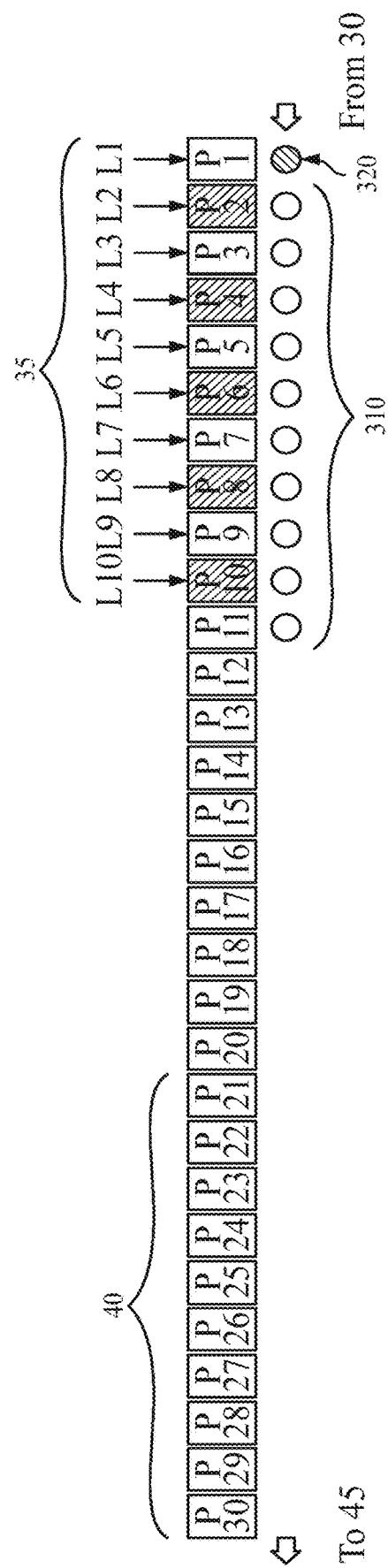

When a predetermined number of pouches have been inserted into each container in the first subset of group 310, the hold-back structures are closed, and the conveyor system advances one position as shown in FIG. 4. Advancing one position moves the group 310 to positions P2-P11, such that the first subset of group 310 is taken out of alignment with the active lanes while a second subset of group 310 is simultaneously moved into alignment with the active lanes. Also, a first container of a second group 320 is simultaneously moved to position P1. After advancing the one position, the conveyor system stops and the hold-back structures open to allow filling of the second subset of the containers of the group 310 with pouches.

Figure 5:
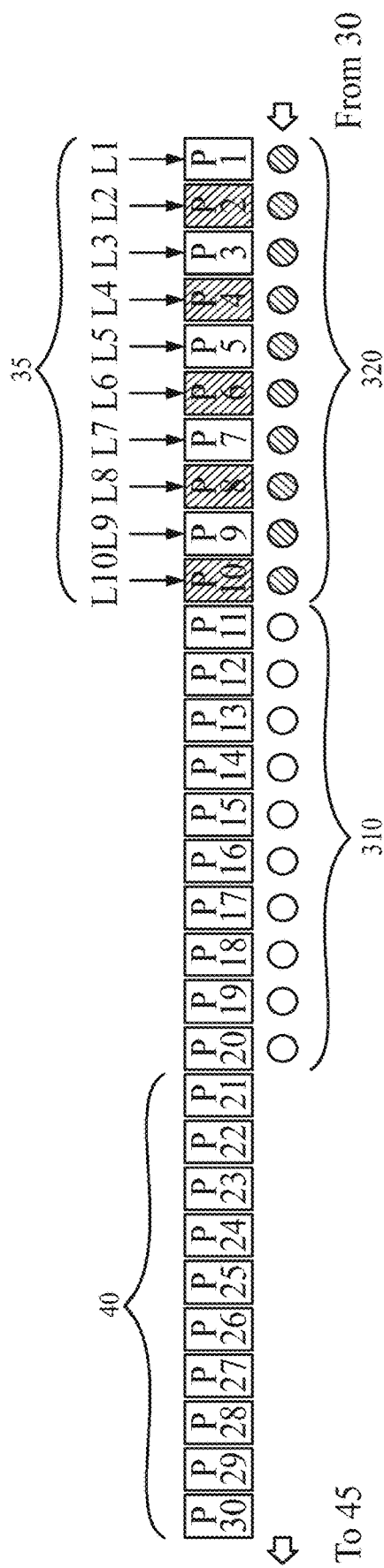

After a predetermined number of pouches have been inserted into each container in the second subset of group 310, the hold-back structures are closed, and the conveyor system advances nine positions as shown in FIG. 5. The advancing of nine positions moves the first group 310 to positions P11-P20, which may be intermediate positions where no action is performed on the containers. The advancing of nine positions also simultaneously moves the second group 320 of containers into positions P1-P10. When the conveyor system has moved the second group 320 to positions P1-P10, the conveyor system stops, and the hold-back structures open to allow filling of a first subset of containers of the second group 320 with pouches.

Figure 6:
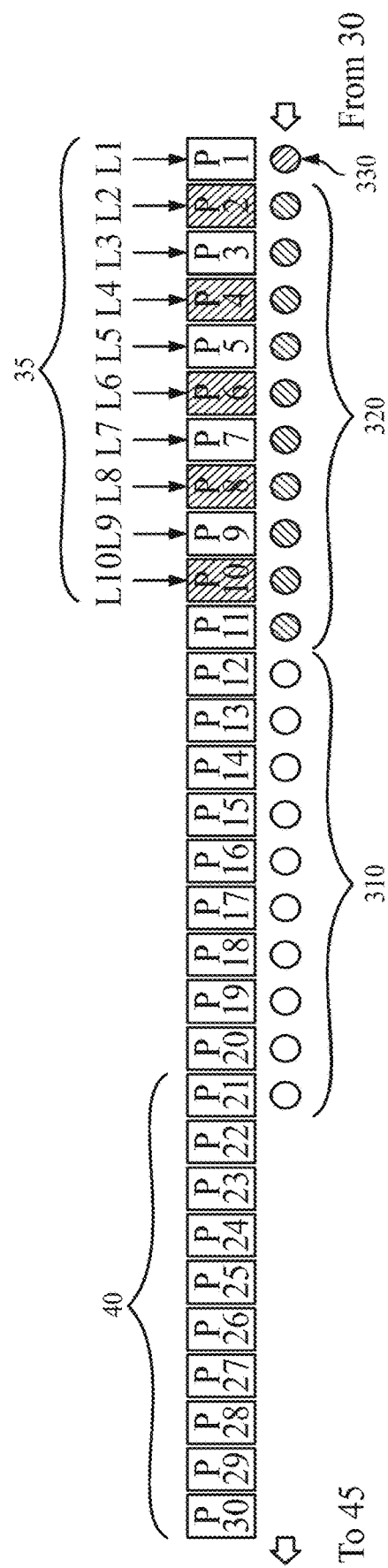

When a predetermined number of pouches have been inserted into each container in the first subset of second group 320, the hold-back structures are closed, and the conveyor system advances one position as shown in FIG. 6. Advancing the one position moves the second group 320 to positions P2-P11, such that the first subset of the second group 320 is no longer aligned with the active lanes, and a second subset of containers of the second group 320 is aligned with the active lanes. The advancing one position also simultaneously moves the first group 310 to positions P12-P21, and also moves a first container of a third group 330 to position P1. After advancing the one position, the conveyor system stops and the hold-back structures open to allow filling of the second subset of containers of the second group 320 with pouches.

Figure 7:
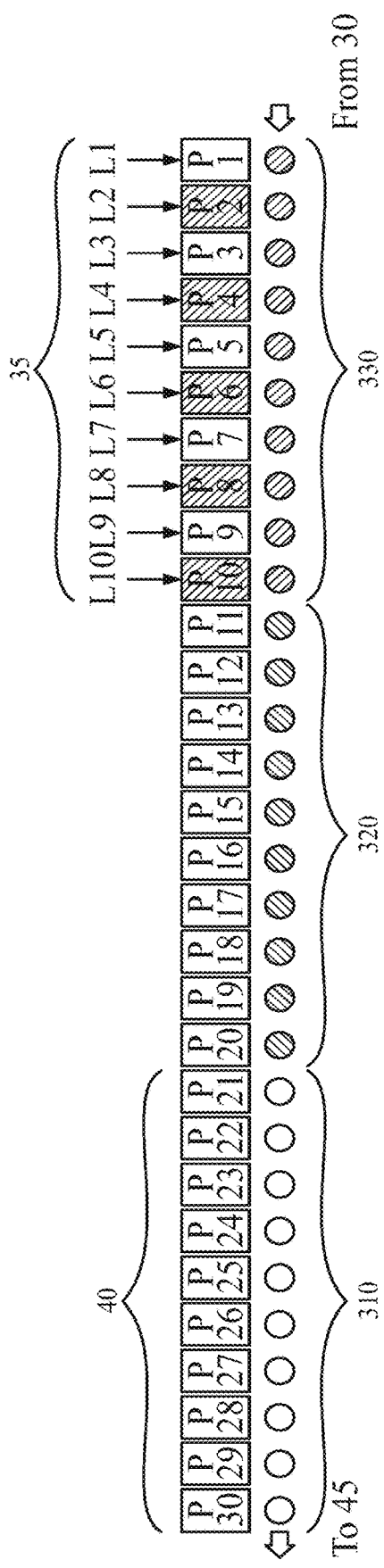

After a predetermined number of pouches have been inserted into each container in the second subset of the second group 320, the hold-back structures are closed, and the conveyor system advances nine positions as shown in FIG. 7. This is similar to the advancement described between FIG. 4 and FIG. 5, and simultaneously moves the first group 310 to positions P21-P30, the second group 320 to positions P11-P20, and a third group 330 to positions P1-P10. When the conveyor system has moved the third group 330 to positions P1-P10, the conveyor system stops, and the hold-back structures open to allow filling of a first subset of containers of the third group 330 with pouches.

Additionally, while the conveyor system is momentarily stopped in the position shown in FIG. 7, the containers in both subsets of the first group 310 are tamped at positions P21-P30. The tamping may comprise, for example, a respective linear actuator at each of positions P21-P30 that is controlled to push downward on the pouches in the containers in the tamping zone 40. A disc or other structural member may be attached to the lower end of each one of the linear actuator at positions P21-P30 for tamping the pouches downward into the respective containers. The tamping of the containers in the first group 310 may happen simultaneously with the filling of the first subset of containers of the third group 330.

Figure 8:
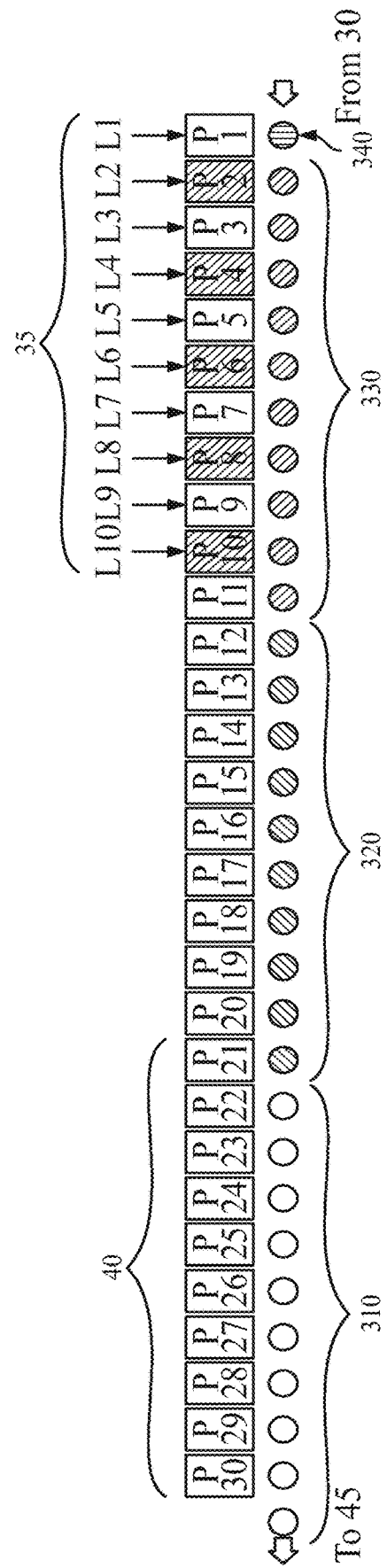

Upon filling the first subset of the third group 330 and tamping the first group 310, the hold-back structures are closed and the conveyor system then advances another one position as shown in FIG. 8. This is similar to the advancement described between FIG. 5 and FIG. 6, and simultaneously moves the first group 310 to positions P22-P30, the second group 320 to positions P12-P21, the third group 330 to positions P2-P11, and a first container of a fourth group 340 to position P1. The conveyor system stops after this advancement of one position, and the hold-back structures open to fill a second subset of containers of the third group 330 with pouches.

The advancement of one position depicted in FIG. 8 also moves a leading container of the first group 310 out of the tamping zone 40. In embodiments, this one container is disengaged from its funnel cup and is conveyed through the outlet station 45 of the system. It should be understood that the next advancement of the conveyor system will be another nine-position advancement (e.g., similar to that described between FIG. 6 and FIG. 7), which will result in the remaining nine containers of the first group 310 being disengaged and conveyed through the outlet 45.

The flow of containers through the system as described with respect to FIGS. 3-8 is exemplary and is not intended to be limiting. Those skilled in the art will recognize that other movement schemes may be used with the system described herein for moving containers through the system in order to fill the containers. For example, group sizes other than ten containers may be used. Also, there may be no inactive lanes in the filling zone. Moreover, there may be no empty positions between the filling zone and the tamping zone.

FIG. 9 shows an exemplary on-line weighing system in accordance herewith. In embodiments, the filled containers 25 are disengaged from the conveyor system and output from the system 5 at outlet 45 (e.g., as described with respect to FIG. 1). Downstream of the outlet 45, the containers are moved in single file to a weigh station 400 referred to as a checkweigher. The movement may be provided by any suitable conveyor 405 that extends between the outlet 45 and the weigh station 400, such as a belt, roller, or sliding conveyor. The outlet 45, conveyor 405, and weigh station 400 are structured and arranged such that the order of containers is preserved as the containers move from the outlet 45 to the weigh station 400.

According to aspects described herein, one or more selectively extendable and retractable gates 410 may be structured and arranged to temporarily stop a single container 25 on a sensor 413 at the weigh station 400. The sensor 413 may be configured to detect a weight of the filled container 25 and communicate this detected weight to the controller C.

When the controller C determines that the container 25 is satisfactory, then the controller C actuates the gate 410 to cause movement of the container 25 from the weigh station 400 to downstream processes, such as an optional, additional tamping process 415 (e.g., that further tamps down the pouches in container), and a lidding process 416 (e.g., that applies a lid to the container). On the other hand, when the controller C determines that a container is not satisfactory, then the controller C may cause a reject actuator 417 to divert the container 25 to a reject chute 420. The reject actuator 417 may comprise any suitable actuator that is capable of diverting the container 25, such as a pneumatic, hydraulic, or servo-type linear actuator with an extendable and retractable push rod that pushes the container off the weigh station 400 and into the reject chute 420, e.g., as indicated by arrow 422.

In exemplary embodiments, a container may be deemed satisfactory when it both: (i) contains an acceptable number of pouches, and (ii) has a weight within lower and upper limits. The number of pouches in the container may be determined using the count sensor 60. More specifically, since the order of the containers is preserved from the output 40 to the weigh station 400, the controller C may be programmed to associate a container 25 at the weigh station 400 with a particular filling event at a particular lane of the system 10. Thus, using the data from the count sensors 60 and the position data of each container 25 in the conveyor system 15, the controller C may be configured to determine a number of pouches in each respective container 25. Accordingly, the controller C may be programmed to compare the number of pouches in a container 25 to a predefined acceptable number, and reject the container 25 at weigh station 400 using reject actuator 417 when the number of pouches in the container does not equal the predefined acceptable number.

As already described herein, the sensor 413 may communicate data to the controller C indicating a weight of the container 25 that is located at the weight station 400. The controller C may be programmed to compare the weight data to a predefined low threshold and a predefined high threshold. When the weight of the container 25 at the weight station 400 is less than the low threshold or greater than the high threshold, the controller C may actuate the reject actuator 417 to divert the container 25 to the reject chute 420.

It is noted that the reject scheme including reject actuator 417 and reject chute 420 are merely exemplary, and implementations are not limited to this particular scheme. For example, rather than diverting containers one at a time, a group of plural containers may be queued at a location downstream of the weigh station, and corresponding plural number of reject actuators may be selectively and individually actuated to reject one or more of the plural containers that were deemed unsatisfactory. The other ones of the plural containers that are not rejected are then passed to the downstream processes.

According to aspects described herein, the weight of the container 25 determined at weight station 400 may be used as the basis for adjusting operation of the motor 160 of the poucher 100 in the lane where the particular container 25 was filled. Specifically, since the order of the containers is preserved from the output 40 to the weigh station 400, and since the position of each container is known at all times in the conveyor system 15, the controller C may be programmed to associate a container 25 at the weigh station 400 with a particular lane of the system 10. The controller C may further be programmed to adjust the output of the motor 160 of the poucher 100 in the particular lane based on the detected weight of the container 25 at the weigh station 400. For example, when the controller C determines from sensor 413 that the container 25 weighs less than the low threshold, the controller C may increase the output of the motor 160 during a feed cycle to increase the amount of tobacco that is contained in each pouch made by the particular poucher 100. Alternatively, when the controller C determines from sensor 413 that the container 25 weighs more than the high threshold, the controller C may decrease the output of the motor 160 to decrease the amount of tobacco that is contained in each pouch made by the particular poucher 100.

Preferably, a predetermined number of weight readings of cans from a given lane are averaged and the average value is compared to a nominal value before adjustment is made to the feed rate of the feeder 135 for that particular lane. Using an average weight reading avoids swings in feeder operation and achieves a smoother response to any tendency of the actual feed rate to move off nominal in any particular lane. Preferably, an average weight of three (3) cans is used, although a greater number is usable. All the while, if any member can within a set is above or below acceptable weight limits, that can is rejected, but its weight reading is used for control purposes.

In addition, the controller is configured to track and compare the magnitude of adjustments amongst the feeders 135 to anticipate a problem with one or more of the lanes that might require the attention of the operator or a shutdown of the machine. In one embodiment, each feed rate is monitored and compared to an average of all feed rates, and if any one feed rate (or more) is about 20% or more above or below the average, the machine is shut down and the errant lane identified to the operator for inspection for accumulation of material, clogs or electro-mechanical problems.

FIG. 10 depicts a block diagram of an exemplary PID (proportional-integral-differential) control algorithm that the controller C may use to adjust the output of the respective motors 160 based on the weight detected at the weight station 400. In FIG. 10, the Operator Sample Weight is a manual pouch weight entered by the operator when the Sample Mode is selected as Manual. The Checkweigher Sample Weight is a program that evaluates weight data received from the sensor 413 and provides control signals for the PID Control when the Sample Mode is selected as Auto. The Gain Schedule is a program that controls proportional and integral gain based on error (e.g., difference between the actual Sample Weight and a Target Weight), and is configured such that adjustment of the motor 160 is more aggressive when the detected Sample Weight is farther from the Target Weight and less aggressive when the detected Sample Weight is closer to the Target Weight. Fast, Medium, and Slow are threshold components for weight range evaluation. Control Output represents control signals that are transmitted to the particular motor 160 for adjusting the speed of the feeder 135. It is noted that the control scheme described in FIG. 10 is merely exemplary, and embodiments may be implemented with other control schemes.

Figure 11:
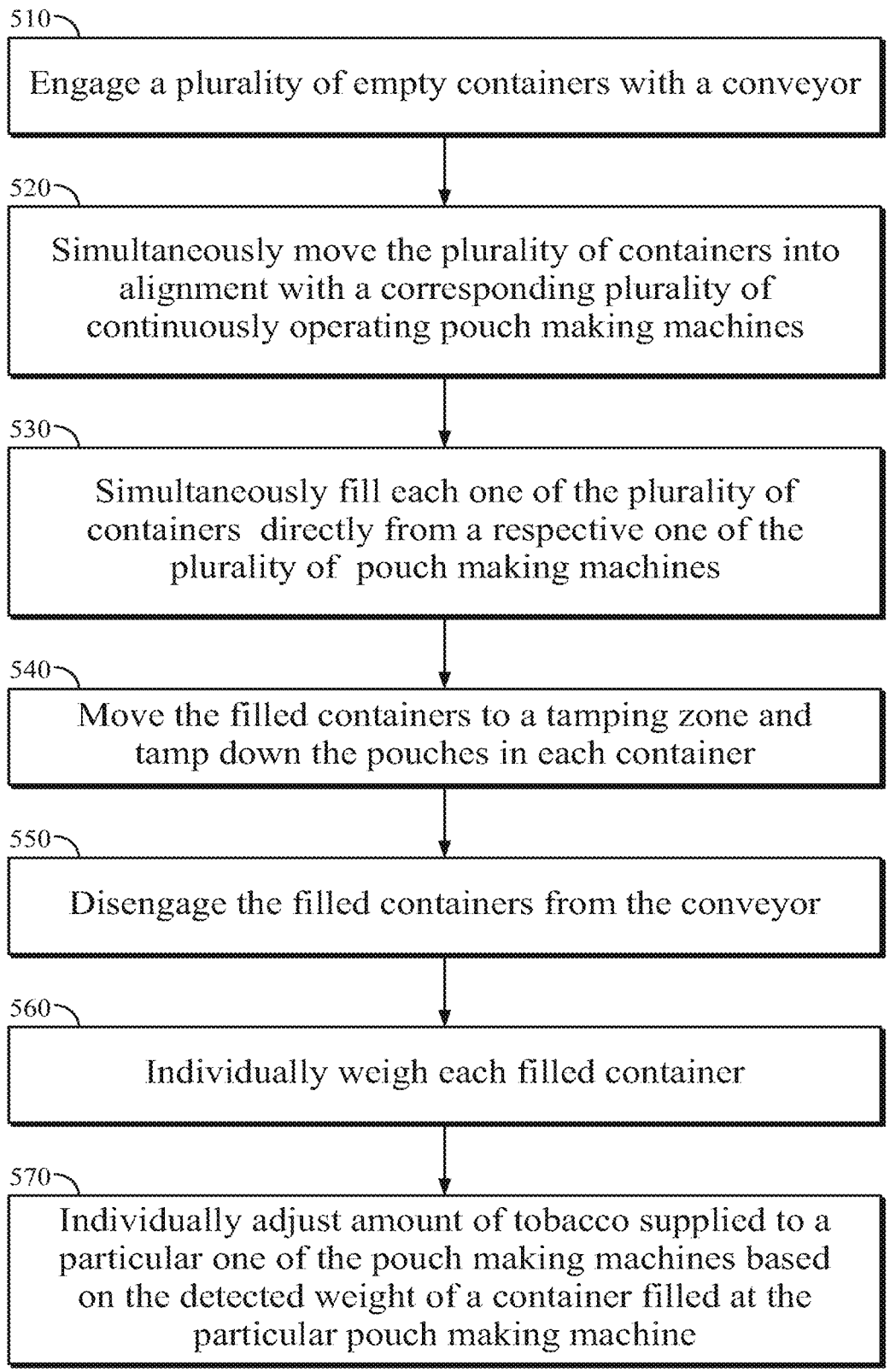
FIG. 11 shows a flow diagram of a method in accordance herewith.

FIG. 11 shows a flow diagram of a method in accordance herewith. Methods in accordance herewith may be performed using the systems described with respect to FIGS. 1-10 and in a manner similar to that described with respect to those figures. The steps of FIG. 11 are described in part by referring to reference numbers associated with elements shown in the previous drawings. At step 510, plural empty containers are engaged by a conveyor. This may comprise, for example, the carousel 23 moving the funnel cups 20 through the input zone 30 to grab empty containers 25.

At step 520, the plural containers are moved into alignment with a corresponding plural number of continuously operating pouch making machines. This may comprise, for example, the carousel 23 moving simultaneously moving the containers into alignment with the active lanes of the system 10, in which each active lane includes a poucher 100 that continuously makes pouches at a substantially constant rate.

At step 530, the plural containers are simultaneously filled. This may comprise, for example, opening the holdback structure 70 of each active lane to drop accumulate pouches into the containers 25, and to permit a number of pouches to drop directly from the pouchers 100 into the containers 25. In embodiments, each container 25 receives pouches from only a single poucher 100.

At step 540, the filled containers are moved to a tamping zone and the contents of each container are tamped down inside the container. This may comprise, for example, the carousel 23 moving the filled containers 25 out of the filling zone 35 and into the tamping zone 40, where the pouches are tamped down into the containers.

At step 550, the filled containers are disengaged from the conveyor. This may comprise, for example, the carousel 23 moving the funnel cups 20 through the outlet 45, where the funnel cups 20 disengage the filled containers. The filled containers may then be moved by another conveyor to the weigh station, with the order of the containers being maintained throughout.

At step 560, each filled container is weighed individually. This may comprise, for example, moving each container individually onto a weight sensor 413.

At step 570, a rate of tobacco supplied to a particular one of the pouch making machines is individually adjusted based on the detected weight of a container that was filled at the particular pouch making machine. This may comprise, for example, detecting the weight of a particular container at step 560, comparing the detected weight to a low and a high threshold, and using the detected weight value to establish and send a control signal to a variable speed motor 160 that drives a tobacco feeder 135 in the poucher 100 that was used to fill the particular container. Each one of the plural pouchers 100 may be individually adjusted based on the detected weights exclusive of the other pouchers 100.

Figure 12:
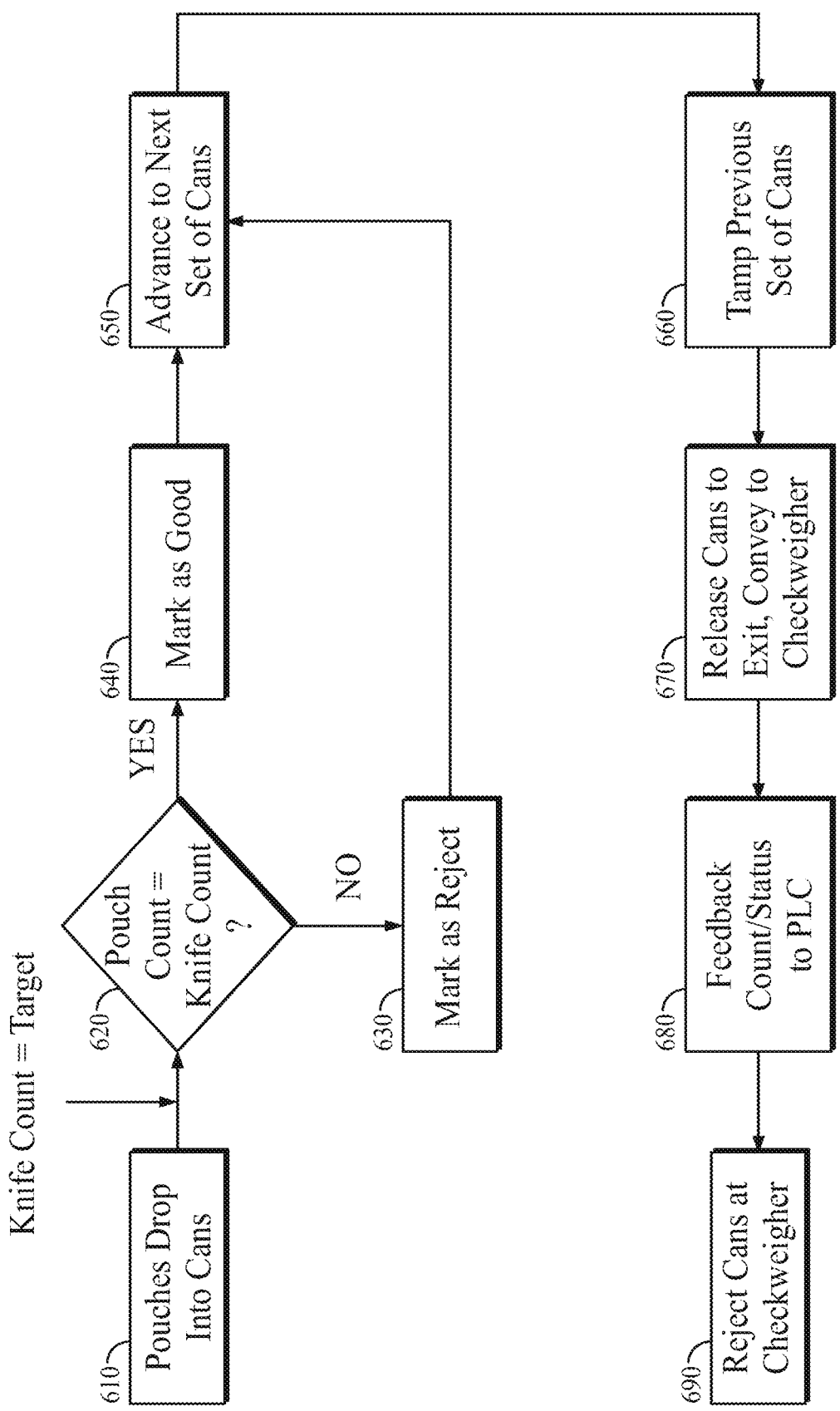
FIG. 12 presents a sequencing diagram for an embodiment of a system and method in accordance herewith.

Referring now to FIG. 12 a sequencing diagram for an embodiment of a system and method, in accordance herewith, is shown. At step 610, after the pouches are formed with a longitudinal (fin) seal and the end seals, they advance to the knives where they are cut and separated. The programmable logic controller (PLC) program counts how many pouches have been cut by counting how many times the knives make a full revolution. At step 610, this value is compared to the number of pouches detected by the pouch sensor. If the two values are equal, then, at step 610, the container is marked as 'Good'. If the values are not equal, the container will be marked as an external reject, at step 630, and will be rejected at step 690 by the checkweigher, regardless of its weight.

Figure 13:
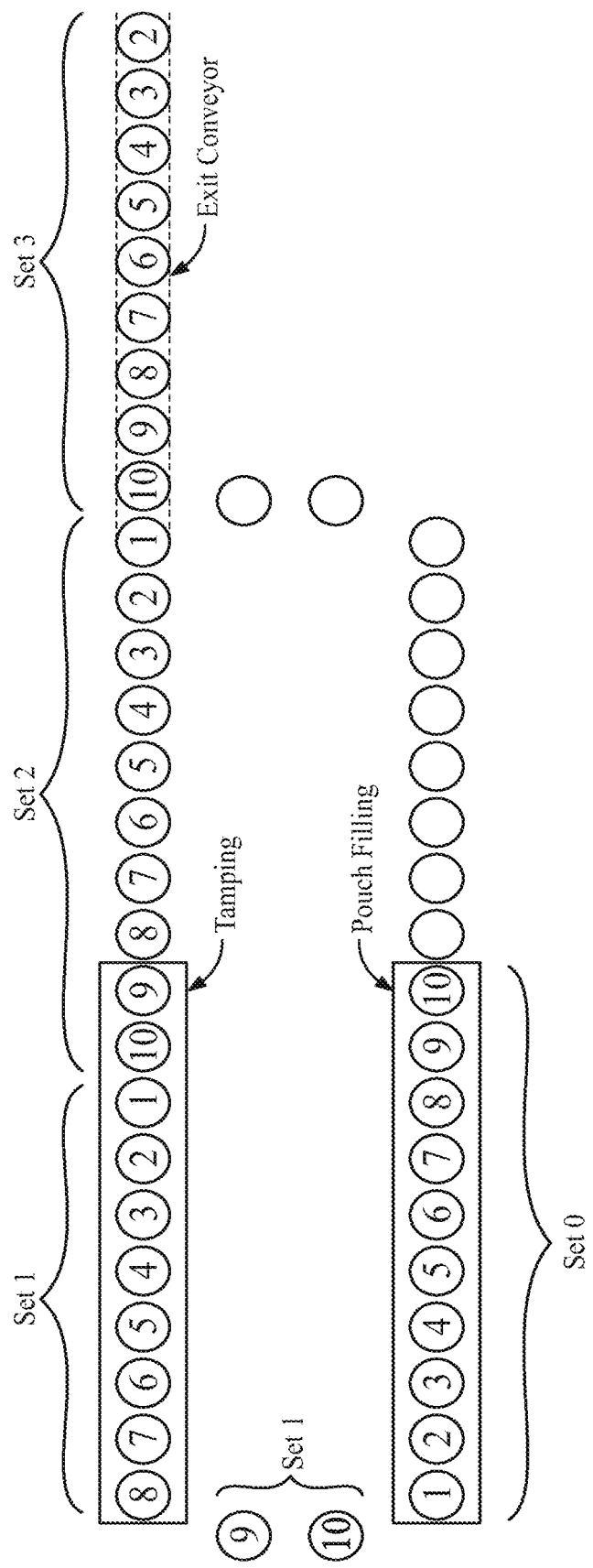
FIG. 13 depicts how the containers transition to different stations on the conveyor from machine startup.

FIG. 13 depicts how the containers transition to different stations on the conveyor from machine startup. The container unit has 40 total cups, but holds three sets of 10 containers, plus some new empty containers from the container infeed before lane 10, which consists of the set being filled, the set being evaluated for count, and the set ready to exit. As shown, Set 0 is the set being filled under lanes 1-10. Set 1 is first set after filling, being evaluated for proper count at lanes 1-8, and prior to the tamping section. Set 2 refers to a second set of containers after filling, with lane 9 and 10 being tamped, lanes 2-8 waiting for exit, and 1 exiting by itself only during the first time the container unit is loaded. Set 3 refers to a third set after filling. The containers exit in order 2, 3, 4, 5, 6, 7, 8, 9, 10, 1 and head towards the checkweigher (not shown).

In operation, each time the container conveyor moves in sets of 10 cups, for each cup that moves, the cup sensor and container sensor must both be on, seeing a cup and a container. Once a set of 10 containers is loaded, any containers missing from the newly loaded set will stop the machine for missing container(s). If this occurs, the hold back structure, or combs, holding pouches while the containers move, do not retract, keeping pouches from dropping on the container conveyor track. Should this occur, the operator must correct the container feed issue and restart the machine. The container unit will load 10 new empty containers. If any are detected missing, the machine stops again. If 10 containers are successfully loaded, then the hold back structure, or combs, will retract and pouches will drop into containers and production continues.

After a set of containers have been filled with pouches, the container conveyor advances them to be tamped. Each tamp head presses down into a container and packs the pouches tighter together. This is done to prevent pouches from sticking out of the containers. The number of times a set of containers is tamped can vary based on the speed that the machine is operating. As may be appreciated, the tamp heads must be up in order for the container conveyor to execute a move. When containers are being tamped, the tamp heads should be able to enter the containers with 1 millimeter of clearance between the outside of the tamp head and the container.

After the pouches are tamped they enter the exit conveyor which carries them to the checkweigher. Containers that have already been marked as "external rejects" will automatically be rejected. The remaining containers marked as "good" will be weighed on the checkweigher to determine if the pouch weights are within an acceptable range of weights. If they are, they will continue on the conveyor. If not, they will be rejected off of the checkweigher. When a container's weight is out of the accepted range, the checkweigher sends needed adjustment information to the poucher which in turn adjusts its feed mechanism to produce tobacco pouches closer to a target pouch weight.

The particulars shown herein are by way of example and for purposes of illustrative discussion only and are presented in the cause of providing what is believed to be the most useful and readily understood description of the principles and conceptual aspects. In this regard, no attempt is made to show structural details in more detail than is necessary for fundamental understanding, the description taken with the drawings making apparent to those skilled in the art how the several forms disclosed herein may be embodied in practice.

It is noted that the foregoing examples have been provided merely for the purpose of explanation and are in no way to be construed as limiting. While aspects have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects have been described herein with reference to particular means, materials, and/or embodiments, the present disclosure is not intended to be limited to the particulars disclosed herein; rather, it extends to all functionally equivalent structures, methods and uses, such as are within the scope of the appended claims.

What is claimed:

1. A system for manufacturing and inserting a desired number of products into containers, the system comprising:
    a product providing system including a plurality of lanes;
    a conveyor system configured to move a plurality of containers into alignment with the plurality of lanes, the conveyor system including,
        a carousel,
        a plurality of funnel cups pivotally attached to the carousel, each of the plurality of funnel cups configured to pivot between a first position in which the funnel cup is configured to engage a respective one of the plurality of containers and a second position in which the funnel cup is configured to disengage from the one of the plurality of containers; and
    a controller configured to,
        control the product providing system so as to provide a desired number of products in each of the plurality of containers when the plurality of containers are aligned with the plurality of lanes, and
        control movement of the carousel.

2. The system of claim 1, each of the plurality of funnel cups is configured to engage a respective one of the plurality of containers.

3. The system of claim 1, wherein
    the first position is horizontal, and
    the second position is inclined.

4. The system of claim 1, wherein the conveyor system further includes an actuator configured to pivot each of the plurality of funnel cups between the first position and the second position.

5. The system of claim 1, wherein each of the plurality of funnel cups is configured to move simultaneously with a respective one of the plurality of containers.

6. The system of claim 1, wherein the controller is configured to control movement of the plurality of containers by repeatedly moving and stopping the carousel.

7. The system of claim 1, wherein
    the product providing system is a pouch providing system, and
    each of the plurality of lanes includes a pouch making machine configured to make pouch products.

8. The system of claim 7, wherein the pouch making machine of each of the plurality of lanes is configured to make the pouch products at a constant rate independent of a position of the plurality of containers.

9. The system of claim 1, wherein each of the plurality of lanes includes a hold-back structure.

10. The system of claim 9, wherein the controller is configured to control the hold-back structure of each of the plurality of lanes so as to provide a desired number of products to a respective one of the plurality of containers.

11. The system of claim 9, wherein
    the hold-back structure of each of the plurality of lanes is moveable between an open position and a closed position,
    in the open position, the hold-back structure is configured to permit the desired number of products to be deposited into a respective one of the plurality of containers aligned with the respective one of the plurality of lanes, and
    in the closed position, the hold-back structure of each of the plurality of lanes is configured to prevent products from passing through the respective one of the plurality of lanes and cause the products to accumulate inside the respective one of the plurality of lanes.

12. The system of claim 11, wherein
    the controller is configured to move the hold-back structure of each of the plurality of lanes from the open position to the closed position while the conveyor system is moving the plurality of containers, and
    the controller is configured to move the hold-back structure of each of the plurality of lanes from the closed position to the open position when the plurality of containers is aligned with the plurality of lanes.

13. The system of claim 1, further comprising: a weigh station configured to detect a weight of each one of the plurality of containers.

14. The system of claim 13, wherein the controller is configured to compare a detected weight of each one of the plurality of containers to a desired range.

15. The system of claim 14, wherein the controller is configured to reject a container of the plurality of containers based on a detected weight being outside of the desired range.

16. The system of claim 1, wherein each of the plurality of lanes includes a count sensor configured to detect a number of products released from the product providing system.

17. The system of claim 16, wherein the controller is configured to reject a container based a detected count being different than a desired count.

18. The system of claim 1, wherein
    the plurality of containers is a first plurality of containers, and
    the conveyor system is configured to simultaneously move the first plurality of containers away from the plurality of lanes and a second plurality of containers into alignment with the plurality of lanes.

19. The system of claim 1, wherein the conveyor system further includes an inclined ramp.

* * * * *